United States Patent
Sakawaki et al.

(10) Patent No.: US 9,660,499 B2
(45) Date of Patent: May 23, 2017

(54) COMPRESSOR HAVING BIASED CONTROLLED MAGNETIC BEARINGS

(75) Inventors: Atsushi Sakawaki, Kusatsu (JP); Yuji Nakazawa, Kusatsu (JP); Yusuke Irino, Kusatsu (JP); Naoya Yamashita, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 469 days.

(21) Appl. No.: 14/347,082

(22) PCT Filed: May 29, 2012

(86) PCT No.: PCT/JP2012/003504
§ 371 (c)(1),
(2), (4) Date: Mar. 25, 2014

(87) PCT Pub. No.: WO2013/046493
PCT Pub. Date: Apr. 4, 2013

(65) Prior Publication Data
US 2014/0234139 A1    Aug. 21, 2014

(30) Foreign Application Priority Data
Sep. 26, 2011   (JP) .................. 2011-209153

(51) Int. Cl.
*H02K 7/09* (2006.01)
*F04D 19/04* (2006.01)
(Continued)

(52) U.S. Cl.
CPC .............. *H02K 7/09* (2013.01); *F04D 17/10* (2013.01); *F04D 19/048* (2013.01);
(Continued)

(58) Field of Classification Search
CPC ...... F04D 17/10; F04D 29/059; F04D 29/058; F04D 19/048; F04D 299/048;
(Continued)

(56) References Cited

U.S. PATENT DOCUMENTS 5,347,190 A * 9/1994 Lewis ................ F16C 32/0455
310/68 B
5,703,424 A * 12/1997 Dorman .............. F16C 32/0451
310/90.5
(Continued)

FOREIGN PATENT DOCUMENTS

| JP | 5-141423 A | 6/1993 | |
| JP | 05-240245 | * 9/1993 | .............. F16C 32/04 |

(Continued)

*Primary Examiner* — Bryan Lettman
*Assistant Examiner* — Timothy Solak
(74) *Attorney, Agent, or Firm* — Birch, Stewart, Kolasch & Birch, LLP

(57) ABSTRACT

A stator is provided which exerts a combined electromagnetic force of a plurality of electromagnets on a drive shaft having a fluctuating load. A controller is provided which controls a current difference between a first coil current passed through a coil of the electromagnet generating an electromagnetic force in a direction opposite to that of the load and a second coil current passed through a coil of the electromagnet generating an electromagnetic force in the same direction as that of the load to perform a position control on the drive shaft. The controller adjusts the second coil current to reduce an average value of the second coil current.

20 Claims, 13 Drawing Sheets

(51) Int. Cl.
*F04D 29/058* (2006.01)
*F16C 32/04* (2006.01)
*F04D 17/10* (2006.01)
*F04D 29/059* (2006.01)

(52) U.S. Cl.
CPC ......... *F04D 29/058* (2013.01); *F04D 29/059* (2013.01); *F16C 32/0442* (2013.01); *F16C 32/0444* (2013.01); *F16C 32/0451* (2013.01); *F16C 32/0457* (2013.01); *F16C 32/0463* (2013.01); *F16C 32/0485* (2013.01)

(58) Field of Classification Search
CPC .. F04D 29/049; F04D 15/0033; F04D 29/048; F04B 2207/01; F04B 2201/1208; F16C 32/0463
See application file for complete search history.

(56) References Cited

U.S. PATENT DOCUMENTS

| | | | |
|---|---|---|---|
| 2002/0047400 A1* | 4/2002 | Ueyama | H02K 7/09 310/90.5 |
| 2004/0070358 A1 | 4/2004 | Yamada | |
| 2007/0080594 A1* | 4/2007 | Gachter | F16C 32/0457 310/90.5 |
| 2009/0096302 A1* | 4/2009 | Barada | F16C 32/0457 310/90.5 |
| 2011/0044832 A1* | 2/2011 | Nijhuis | F04D 15/02 417/423.12 |

FOREIGN PATENT DOCUMENTS

| | | |
|---|---|---|
| JP | 5-240245 A | 9/1993 |
| JP | 5-312214 A | 11/1993 |
| JP | 10-141373 A | 5/1998 |
| JP | 2002-333019 A | 11/2002 |
| JP | 2004-132441 A | 4/2004 |
| JP | 2005-140190 A | 6/2005 |
| JP | 2008-45687 A | 2/2008 |
| JP | 2010-121714 A | 6/2010 |

* cited by examiner

COMPRESSOR HAVING BIASED CONTROLLED MAGNETIC BEARINGS

TECHNICAL FIELD

The present invention relates to magnetic bearings which support a rotating shaft by an electromagnetic force without contact, and compressors including such a magnetic bearing.

BACKGROUND ART

Magnetic bearings are often used in devices which have a drive shaft which rotates at high speed, such as a so-called turbo compressor. In magnetic bearings, for ease of designing the position control system, it is desirable that a control current for causing the electromagnets to generate an electromagnetic force and the sum of the electromagnetic forces (also referred to as a "combined electromagnetic force") of the electromagnets have a linear relationship. There is a commonly used linearization technique in which while a bias current (fixed value) is being previously passed through the coils of the electromagnets, the control current (which varies depending on the position of the drive shaft) is superposed on the bias current, so that the resultant current is passed through the coils (see, for example, PATENT DOCUMENT 1).

CITATION LIST

Patent Document

PATENT DOCUMENT 1: Japanese Unexamined Patent Publication No. H10-141373

SUMMARY OF THE INVENTION

Technical Problem

However, when the above linearization technique is employed, a current is passed through each electromagnet coil, and therefore, the electromagnets attract each other, resulting in unnecessary power consumption.

With the above problem in mind, the present invention has been made. It is an object of the present invention to provide a magnetic bearing in which power consumed by the coil of the electromagnet can be reduced while the linearity between the control current and the combined electromagnetic force is maintained.

Solution to the Problem

To achieve the above object, a magnetic bearing according to an embodiment of the present invention includes a stator (21) including a plurality of electromagnets (24) and configured to exert a combined electromagnetic force (F) of the plurality of electromagnets (24) on a drive shaft (13) having a fluctuating load ($L_d$), and a controller (30) configured to control a current difference between a first coil current ($I_U$) passed through a coil (23) of the electromagnet (24) generating an electromagnetic force in a direction opposite to that of the load ($L_d$) and a second coil current ($I_L$) passed through a coil (23) of the electromagnet (24) generating an electromagnetic force in the same direction as that of the load ($L_d$) to perform a position control on the drive shaft (13), and adjust the second coil current ($I_L$) to reduce an average value of the second coil current ($I_L$).

In this configuration, the currents of the electromagnets (24) of the stator (21) are controlled so that a position control is performed on the drive shaft (13). The second coil current (a lower coil current ($I_L$) described below) passed through the coil (23) of the electromagnet (24) generating an electromagnetic force in the same direction as that of the load ($L_d$) is adjusted so that an average value of the second coil current ($I_L$) is reduced. In this case, because the position control is also performed in the present invention, the first coil current ($I_U$) as well as the second coil current ($I_L$) are adjusted so that a difference between the first coil current ($I_U$) and the second coil current ($I_L$) has a value required for the position control. Thus, the second coil current ($I_L$) is adjusted to decrease (e.g., approach zero), and an average value of the first coil current ($I_U$) also decreases.

Advantages of the Invention

According to the present invention, the current of the coil (23) generating an electromagnetic force in the same direction as that of the load ($L_d$) can be decreased, and therefore, the power consumption of the magnetic bearing (20) can be reduced.

DESCRIPTION OF EMBODIMENTS

Embodiments of the present invention will now be described with reference to the accompanying drawings. Note that the embodiments below are merely preferred examples in nature and are not intended to limit the present invention, application, or uses.

First Embodiment of the Invention

In a first embodiment of the present invention, a turbo compressor (1) will be described as an example in which a magnetic bearing according to the present invention is used. The turbo compressor (1) of this embodiment is connected to a refrigerant circuit (not shown) which performs refrigeration cycle operation using a circulating refrigerant, and compresses the refrigerant.

Overall Configuration

Figure 1:
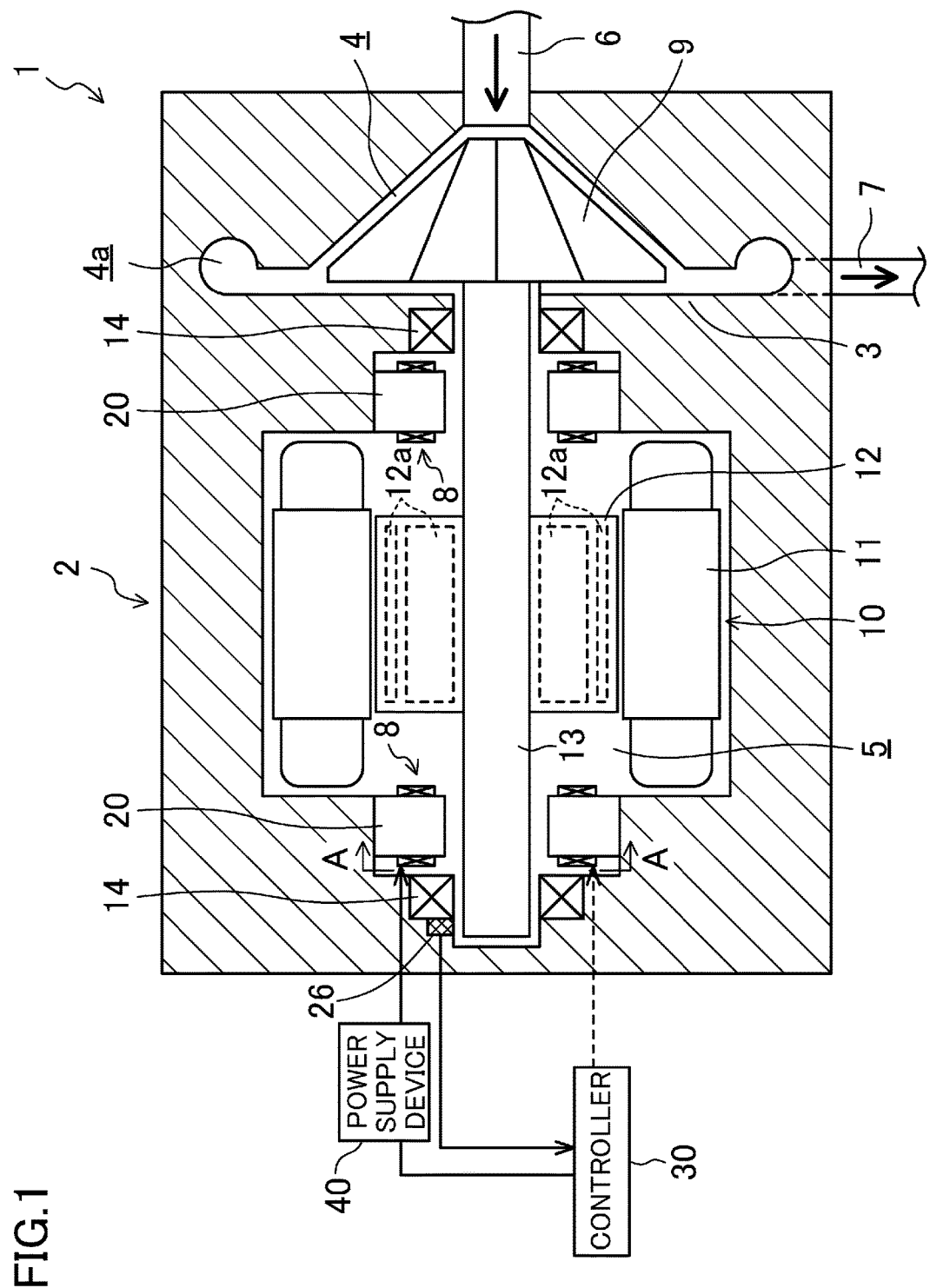
FIG. 1 is a schematic diagram showing a structure of a turbo compressor according to a first embodiment.

FIG. 1 is a schematic diagram showing a structure of the turbo compressor (1) of the first embodiment. As shown in FIG. 1, the turbo compressor (1) includes a casing (2), an impeller (9), and an electric motor (10).

The casing (2) is formed in the shape of a cylinder whose opposite ends are closed, and is positioned so that the axis line of the cylinder is horizontally oriented. A space in the casing (2) is partitioned by a wall portion (3) which is located a predetermined distance from a right end portion of the casing (2) in FIG. 1. A space on the right side of the wall portion (3) forms an impeller chamber (4) which accommodates the impeller (9), and a space on the left side of the wall portion (3) forms an electric motor space (5) which accommodates the electric motor (10). A compression space (4a) which is in communication with the impeller chamber (4) is formed at an outer circumference side of the impeller chamber (4).

An intake pipe (6) for introducing the refrigerant from the refrigerant circuit into the impeller chamber (4), and a discharge pipe (7) for returning the high-pressure refrigerant compressed in the impeller chamber (4) to the refrigerant circuit, are connected to the casing (2).

The impeller (9) includes a plurality of blades which are arranged so that the impeller has a generally conical outer shape. The impeller (9) is accommodated in the impeller chamber (4) and is fixed to an end of a drive shaft (13) (rotating shaft) of the electric motor (10).

The electric motor (10) is accommodated in the casing (2) and drives the impeller (9). The electric motor (10) includes a stator (11), a rotor (12), and the drive shaft (13). The stator (11) has a tubular form and is fixed to an inner circumferential wall of the casing (2). The rotor (12) has a cylindrical form and is inserted in the stator (11) with a predetermined gap (air gap) being formed therebetween. The drive shaft (13) is inserted in and fixed to the rotor (12) with the central axis thereof coinciding with the central axis of the rotor (12). A plurality of permanent magnets (12a) are embedded in the rotor (12). The rotor (12) is rotated in the stator (11) by the permanent magnets (12a) being attracted to rotate by a rotating magnetic field generated in the stator (11). The drive shaft (13) is arranged to extend in a horizontal direction.

The electric motor (10) includes a bearing mechanism (8). The bearing mechanism (8) includes two touchdown bearings (14, 14) having a generally tubular shape, and two magnetic bearings (20, 20). Note that the electric motor (10) may include a touchdown bearing which supports the drive shaft (13) in the thrust direction.

The touchdown bearing (14) and the magnetic bearing (20) are for supporting the drive shaft (13) in the radial direction. The touchdown bearing (14) and the magnetic bearing (20) are both fixed in the casing (2). The magnetic bearings (20, 20) are provided at the opposite ends of the drive shaft (13) to support the drive shaft (13) at the opposite ends thereof (one of the magnetic bearings (20, 20) is provided at one end of the drive shaft (13) and the other magnetic bearing (20) is provided at the other end). The touchdown bearings (14, 14) are provided further from the middle of the drive shaft (13) than the magnetic bearings (20, 20) to support the opposite end portions of the drive shaft (13).

As described in detail below, the magnetic bearings (20, 20) include a plurality of electromagnets (24) which are arranged so that the sum (combined electromagnetic force: F) of the electromagnetic forces of the electromagnets (24) is exerted on the drive shaft (13) to support the drive shaft (13) without contact.

The touchdown bearings (14, 14) have an inner diameter which is set so that when the magnetic bearings (20, 20) support the drive shaft (13) without contact, the touchdown bearings (14, 14) also do not contact the drive shaft (13). The touchdown bearing (14) is also configured to support the drive shaft (13) when a current is not passed through the magnetic bearing (20). A current is not passed through the magnetic bearing (20), for example, when the electric motor (10) is off, the magnetic bearing (20) is out of control due to some reason, etc.

Configuration of Touchdown Bearing (14)

The touchdown bearing (14) includes a ball bearing. A gap between the touchdown bearing (14) and the drive shaft (13) is formed to be smaller than a gap between the magnetic bearing (20) and the drive shaft (13). As a result, when the magnetic bearings (20, 20) are not operating, the touchdown bearing (14) can support the drive shaft (13) while causing the drive shaft (13) not to be in contact with the magnetic bearing (20). In other words, if a current is not passed through the magnetic bearing (20) when the electric motor (10) is off, the magnetic bearing (20) is out of control due to some reason, etc., the touchdown bearing (14) can reduce or prevent damage to the magnetic bearing (20). Note that the touchdown bearing (14) is not limited to a ball bearing, and may be, for example, a simple cylindrical member.

Configuration of Magnetic Bearing (20)

Figure 2:
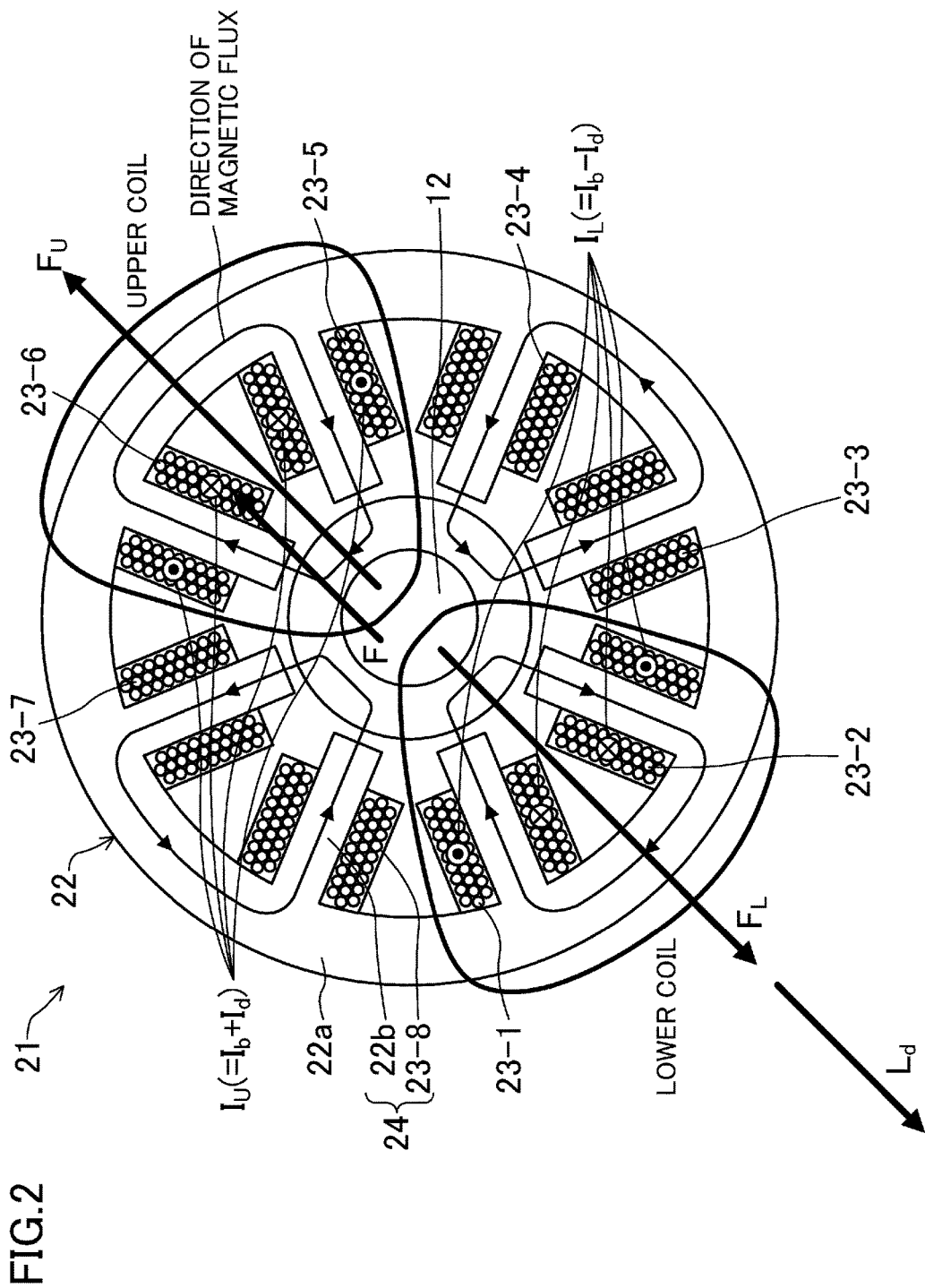
FIG. 2 is a transverse cross-sectional view of a magnetic bearing according to the first embodiment.
Figure 3:
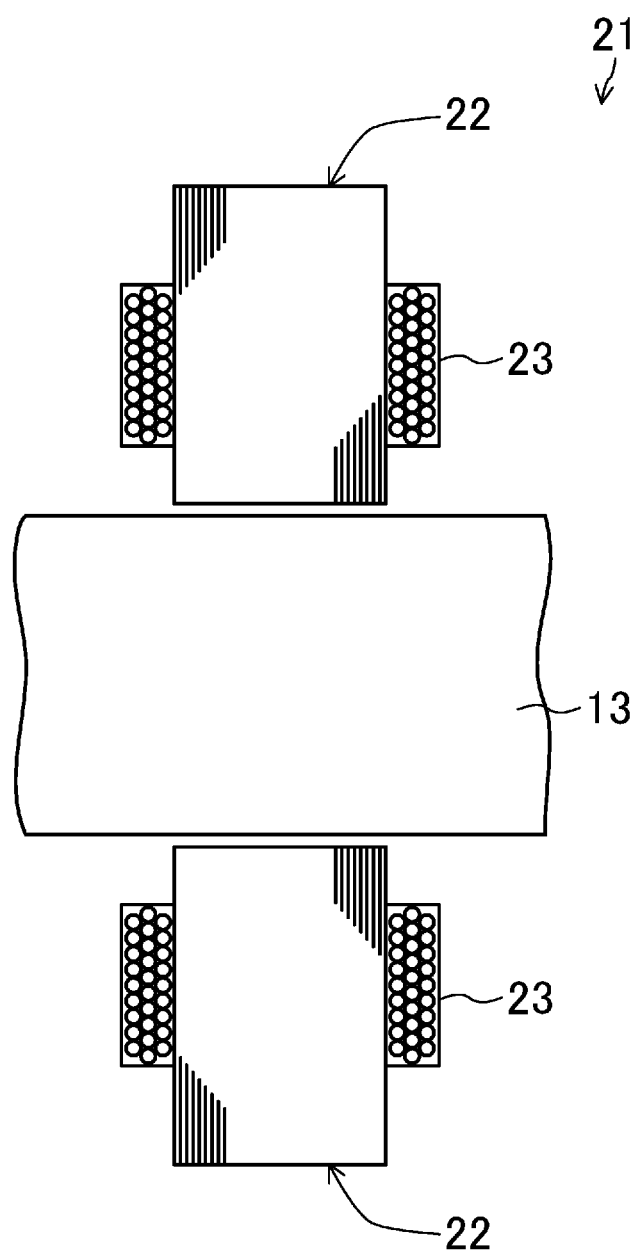
FIG. 3 is a longitudinal cross-sectional view of the magnetic bearing of the first embodiment.

FIG. 2 is a transverse cross-sectional view (a cross-sectional view perpendicular to the drive shaft) of the magnetic bearing (20) of the first embodiment. FIG. 3 is a longitudinal cross-sectional view (a cross-sectional view in the drive shaft direction) of the magnetic bearing (20) of the first embodiment. As shown in FIG. 2, the magnetic bearing (20) is a so-called heteropolar radial bearing. In this example, the magnetic bearing (20) includes a stator (21), a gap sensor (26), a controller (30), and a power supply device (40).

The gap sensor (26) is attached to the casing (2) and detects a position in the radial direction of the drive shaft (13) with respect to the magnetic bearing (20).

The stator (21) includes a core portion (22) and coils (23). The core portion (22) includes electromagnetic steel plates which are stacked one on top of another, and has a back yoke portion (22a) and a plurality of tooth portions (22b). The back yoke portion (22a) has a generally tubular shape. The tooth portions (22b) are integrally formed with the back yoke portion (22a), protruding from an inner circumferential surface of the back yoke portion (22a) inward in the radial direction. The core portion (22) of this embodiment has eight tooth portions (22b) which are arranged along the inner circumference of the back yoke portion (22a) and are equally spaced (pitch: 45 degrees). Most inner surfaces of the tooth portions (22b) face the drive shaft (13) with a predetermined gap being formed therebetween.

In the stator (21), a coil (23) is wound around each tooth portion (22b), and each pair of the tooth portion (22b) and the coil (23) form an electromagnet (24). Specifically, the stator (21) of this embodiment includes eight electromagnets (24). In FIG. 2, each coil (23) is identified by a reference numeral followed by a hyphen and a number (1-8) (e.g., 23-1, 23-2, . . . ). In the stator (21), each two coils (23) are paired and connected together. Specifically, in each of pairs of the coils (23-1) and (23-2), the coils (23-3) and (23-4), the coils (23-5) and (23-6), and the coils (23-7) and (23-8), the coils (23) are connected together. The power supply device (40) is connected to, and supplies power to, each coil pair.

Power Supply Device (40)

The power supply device (40) can control the magnitudes of voltages supplied to the coil pairs separately from each other. In this embodiment, there are four coil pairs, and therefore, the power supply device (40) has four outputs. The magnitude of a voltage supplied to each coil pair by the power supply device (40) is controlled by the controller (30). In this example, the power supply device (40) changes the output voltage based on a voltage command value output by the controller (30). As a result, a current flowing through each coil (23) is changed. The power supply device (40) may be, for example, a so-called pulse width modulation (PWM) amplifier.

Note that the power supply device (40) is configured to allow a current to flow both forward and backward.

Configuration of Controller (30)

Next, a configuration of the controller (30) will be described. Note that, in the description that follows, an "upper coil" refers to the coil (23) of the electromagnet (24) which generates an attraction force (electromagnetic force $(F_U)$) whose direction is opposite to the direction of a load $(L_d)$ exerted on the drive shaft (13) in the radial direction. A "lower coil" refers to the coil (23) of the electromagnet (24) which generates an attraction force (electromagnetic force $(F_L)$) whose direction is the same as the direction of the load $(L_d)$. In other words, as used herein, the terms "upper" and "lower" with respect to a coil are defined based on a relationship between the direction of the electromagnetic force and the direction of the load $(L_d)$, and may or may not match upper and lower positions of the magnetic bearings (20, 20) as they are installed. In FIG. 2, the upper and lower coils are indicated by surrounding thick lines. There are two lower coils (23-1, 23-2)) and two upper coils (23-5, 23-6) with respect to the load $(L_d)$ of FIG. 2.

The controller (30) includes a microcomputer (not shown) and a program which causes the microcomputer to operate. The controller (30) controls a current difference between a current (upper coil current $(I_U)$) passed through the upper coil and a current (lower coil current $(I_L)$) passed through the lower coil to control a position of the drive shaft (13). Specifically, the controller (30) passes the sum of a control current $(I_d)$ and a bias current $(I_b)$ through the upper and lower coils. Here, the control current $(I_d)$ is a current for causing the coil (23) of each electromagnet (24) to generate an electromagnetic force. The control current of the upper coil is $+I_d$ and the control current of the lower coil is $-I_d$. The bias current $(I_b)$ is a current for linearizing a relationship between the control current $(I_d)$ and the combined electromagnetic force (F).

Therefore, the upper coil current $(I_U)$ is a current having a magnitude of $I_b+I_d$. The lower coil current $(I_L)$ is a current having a magnitude of $I_b-I_d$. The upper coil current $(I_U)$ corresponds to a first coil current of the present invention, and the lower coil current $(I_L)$ corresponds to a second coil current of the present invention. If the current difference between the upper coil current $(I_U)$ and the lower coil current $(I_L)$ is controlled, the combined electromagnetic force (F) exerted on the drive shaft (13) can be controlled, and therefore the position of the drive shaft (13) can be controlled. The magnitudes of the upper and lower coil currents $(I_U, I_L)$ are controlled via the power supply device (40).

The linearization scheme is summarized as follows.

$$I_U = I_b + I_d$$

$$I_L = I_b - I_d \quad \text{(Relational Expression C)}$$

Figure 4:
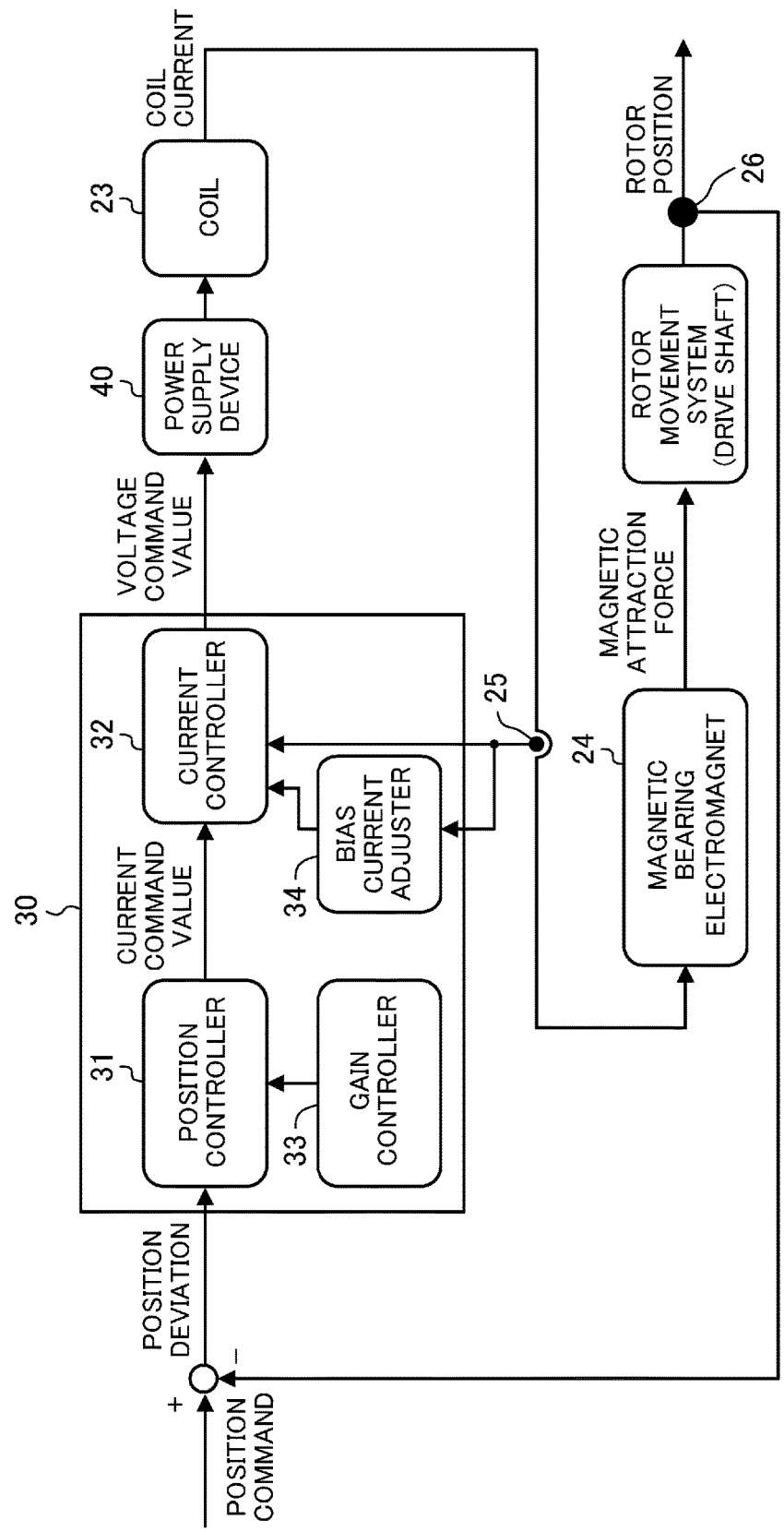
FIG. 4 is a block diagram for describing a configuration of a controller.

The controller (30) sequentially adjusts the lower coil current $(I_L)$ to reduce an average value (e.g., an average based on the value of an integral) of the lower coil current $(I_L)$. Specifically, in the controller (30) in this embodiment, under the control of the power supply device (40), the value of the bias current $(I_b)$ is updated by increasing or decreasing the value of the bias current $(I_b)$ at predetermined intervals to approach the value of the control current $(I_d)$. FIG. 4 is a block diagram for describing a configuration of the controller (30). As shown in FIG. 4, the controller (30) includes a position controller (31), a current controller (32), a gain controller (33), and a bias current adjuster (34). The controller (30) also includes a timer (not shown) in order to periodically update the value of the bias current $(I_b)$. The timer outputs an interrupt signal to the current controller (32) at the above update intervals.

Position Controller (31)

The position controller (31) outputs a position command which indicates a position in the radial direction of the drive shaft (13), and a current command value which indicates a magnitude of the control current $(I_d)$, depending on a deviation from the position in the radial direction of the drive shaft (13) which has been detected by the gap sensor (26). More specifically, the position controller (31) changes the current difference between the upper coil current $(I_U)$ and the lower coil current $(I_L)$ within a predetermined range to determine the control current $(I_d)$ so that the drive shaft (13) is located at a desired position. In the magnetic bearing (20), the eight electromagnets (24) form four electromagnet pairs, and therefore, the position controller (31) generates four current command values for the electromagnet pairs.

The position controller (31) also increases or decreases the change range of the current difference when the upper coil current $(I_U)$ decreases or increases, respectively, depending on the load $(L_d)$. Specifically, the position controller (31) achieves the control of the change range by adjusting a feedback gain $(K_c)$ of a feedback control, at predetermined intervals (described below).

Current Controller (32)

The current controller (32) calculates a voltage which the power supply device (40) is to output, and outputs a voltage command value indicating the voltage to the power supply device (40). The magnetic bearing (20) includes a current detector (25) which detects the upper coil current $(I_U)$ and the lower coil current $(I_L)$. The current controller (32) determines the voltage command value based on the detection value of the current detector (25) which is fed back thereto, in order to cause the sum of the bias current $(I_b)$ and the control current ($I_d$) which is determined based on the current command value to flow through the upper and lower coils.

Bias Current Adjuster (34)

The bias current adjuster (34) periodically updates the value of the bias current ($I_b$). Specifically, the bias current adjuster (34) calculates an initial control current ($I_{d0}$) and an initial bias current ($I_{b0}$) from the values (detection values) of certain initial upper and lower coil currents ($I_{U0}$, $I_{L0}$) according to the following relational expression (A1). A new bias current ($I_b$) is derived from a geometric mean of these values (see a relational expression (A2)).

$$I_{b0} = (I_{U0} + I_{L0})/2$$

$$I_{d0} = (I_{U0} - I_{L0})/2 \qquad \text{Relational Expression (A1)}$$

$$I_b = \sqrt{(I_{b0} \times I_{d0})} \qquad \text{Relational Expression A2)}$$

Such a geometric mean is employed based on the following idea.

If the upper coil current ($I_U$) and the lower coil current ($I_L$) are obtained by the linearization scheme of the relational expression (C), the control current ($I_d$) and the combined electromagnetic force (F) have a linear relationship represented by:

$$F = k \times I_b \times I_d \qquad (1)$$

where k is a proportionality constant. For example, when, in the initial state, the combined electromagnetic force is $F_0$, the bias current is $I_{b0}$, and the control current is $I_{d0}$, the following expression is obtained:

$$F_0 = k \times I_{b0} \times I_{d0} \qquad (2)$$

When the control current is caused to be equal to the bias current while the combined electromagnetic force is maintained at $F_0$, the expression (1) becomes:

$$F_0 = k \times I_b \times I_d = k \times I_b^2 \qquad (3)$$

A new bias current ($I_b$) is derived from the expressions (2) and (3) as follows:

$$I_b = \sqrt{(I_{b0} \times I_{d0})}$$

In this case, according to the relational expression (C), the upper coil current ($I_U$), which is $I_{U0} = I_{b0} + I_{d0}$ in the initial state, becomes $I_U = 2\sqrt{(I_{b0} \times I_{d0})}$ after adjustment, and the lower coil current ($I_L$), which is $I_{L0} = I_{b0} - I_{d0}$ in the initial state, becomes $I_L = 0$ after adjustment. In other words, the absolute values of the upper coil current ($I_U$) and the lower coil current ($I_L$) both decrease. In other words, if the bias current ($I_b$) is adjusted to a new bias current ($I_b$) which is a geometric mean of the previous bias current value and the control current value, power consumed by the coils (23) of the electromagnets (24) can be reduced.

After the new bias current ($I_b$) has been thus obtained, the bias current adjuster (34) updates the value of the bias current ($I_b$). Thereafter, the current controller (32) outputs voltage command values for the upper and lower coils to the power supply device (40) to cause the upper and lower coil currents ($I_U$, $I_L$) obtained according to the relational expression (C) to flow. The value of the control current ($I_d$) which is used in obtaining the voltage command values is a current value which is determined, corresponding to the current command values.

Note that, in order to calculate the relational expression (A), the detection value of the current detector (25) is input to the bias current adjuster (34) (see FIG. 4). Although the upper coil current ($I_U$) and the lower coil current ($I_L$) have a fluctuating component, the current controller (32) calculates and uses direct current components of these currents in calculating the relational expression (A).

In this example, the current controller (32) updates the value of the bias current ($I_b$) which is used in calculating the upper and lower coil currents ($I_U$, $I_L$), with the value derived by the bias current adjuster (34), in synchronization with the interrupt signal of the timer. The intervals (the timer's cycle) at which the bias current ($I_b$) is updated is preferably much longer than the intervals at which the position controller (31) performs the position control. In this embodiment, the intervals at which the bias current ($I_b$) is updated is set to be 100-1000 times as long as the intervals at which the position controller (31) performs the position control.

Gain Controller (33)

The gain controller (33) outputs a command value for adjusting the feedback gain ($K_c$) to the position controller (31) in synchronization with the updating of the bias current ($I_b$). In this example, the gain controller (33) outputs the command value for adjusting the feedback gain ($K_c$) to the position controller (31) according to the following relational expression (B).

$$K_c = K_{c0} \times I_{b0}/I_b \qquad \text{Relational Expression (B)}$$

where $I_{b0}$ is a certain initial value of the bias current, and $K_{c0}$ is the feedback gain ($K_c$) of the position control which is adjusted when the value of bias current is $I_{b0}$.

Operation of Controller (30)

Figure 5:
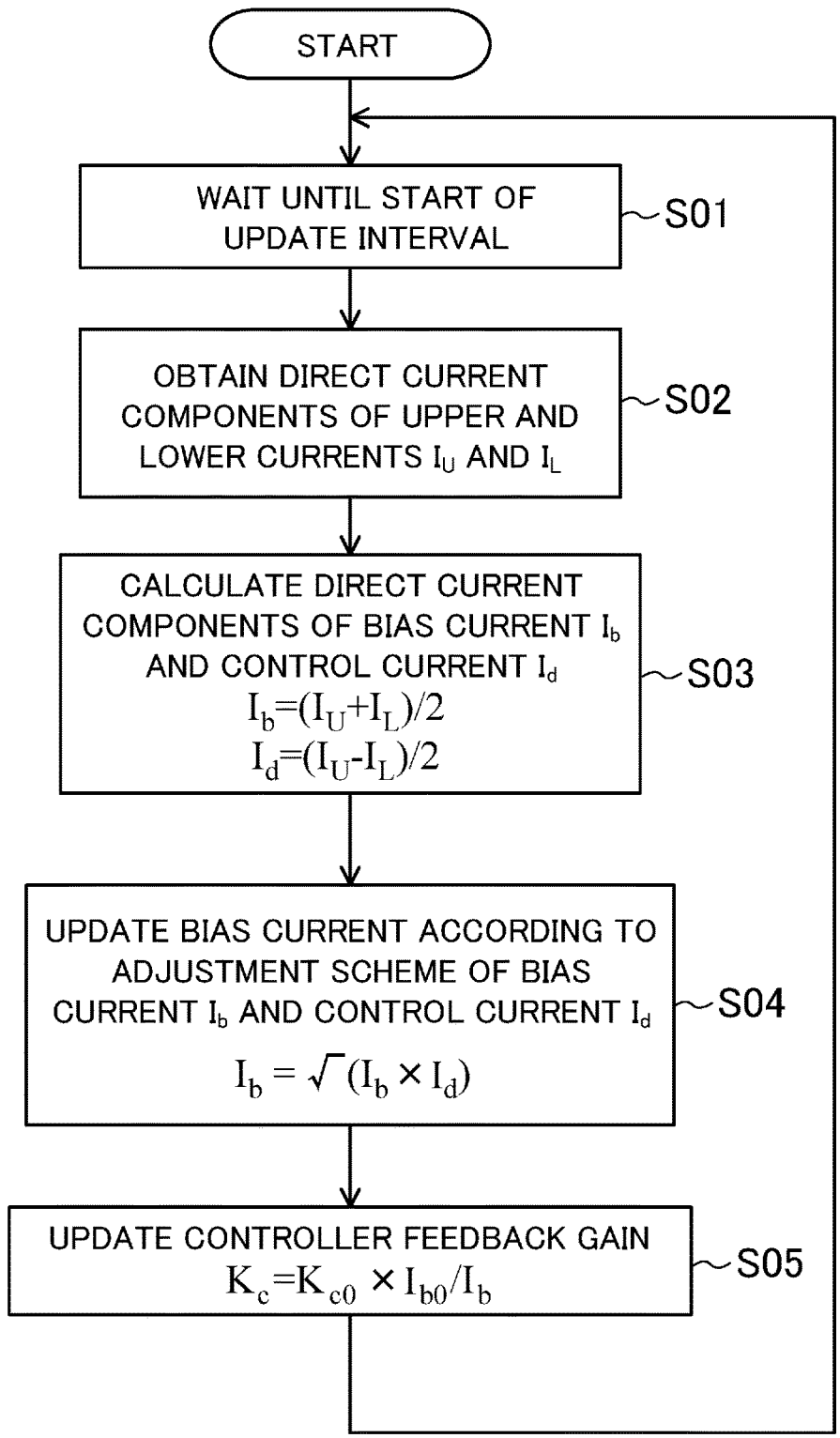
FIG. 5 is a flowchart for describing adjustment of a bias current according to the first embodiment.

FIG. 5 is a flowchart for describing the bias current adjustment of the first embodiment. The controller (30) performs processes of steps (S01)-(S05) of FIG. 5.

In step (S01), the bias current adjuster (34) waits until the start of the update interval of the bias current ($I_b$), i.e., until the reception of the interrupt signal of the timer, before performing an updating process. In the wait state, the current controller (32) determines the upper and lower coil currents ($I_U$, $I_L$) using the value of the current bias current ($I_b$), and voltage command values corresponding to the upper and lower coil currents ($I_U$, $I_L$) to the power supply device (40). When the wait state is canceled due to interruption by the timer, the operation of the bias current adjuster (34) proceeds to the next step (S02).

In step (S02), the bias current adjuster (34) obtains the direct current components of the upper coil current ($I_U$) and the lower coil current ($I_L$) from the detection values of the upper coil current ($I_U$) and the lower coil current ($I_L$), respectively, detected by the current detector (25). The direct current components of the upper coil current ($I_U$) and the lower coil current ($I_L$) may, for example, be obtained using a low-pass filter.

In step (S03), the bias current adjuster (34) calculates the bias current ($I_b$) and the control current ($I_d$) according to the relational expression (A1) using the direct current components of the upper and lower coil currents ($I_U$, $I_L$) obtained in step (S02). In other words, in step (S03), the bias current adjuster (34) obtains direct current components of the bias current ($I_b$) and the control current ($I_d$).

In step (S04), the bias current adjuster (34) calculates a new bias current ($I_b$) according to the relational expression (A2) using the values of the bias current ($I_b$) and the control current ($I_d$) obtained in step (S03). Thereafter, the current controller (32) outputs voltage command values for the upper and lower coils to the power supply device (40) in order to cause the upper and lower coil currents ($I_U$, $I_L$) determined according to the relational expression (C) to flow through the coils. Here, $I_d$ used in calculating the upper and lower coil currents ($I_U$, $I_L$) is the value of the control current ($I_d$) which is determined based on the current command value output by the position controller (31).

In step (S05), the position controller (31) updates the feedback gain ($K_c$) for the position control based on the command value which has been generated by the gain controller (33) according to the relational expression (B).

Figure 6:
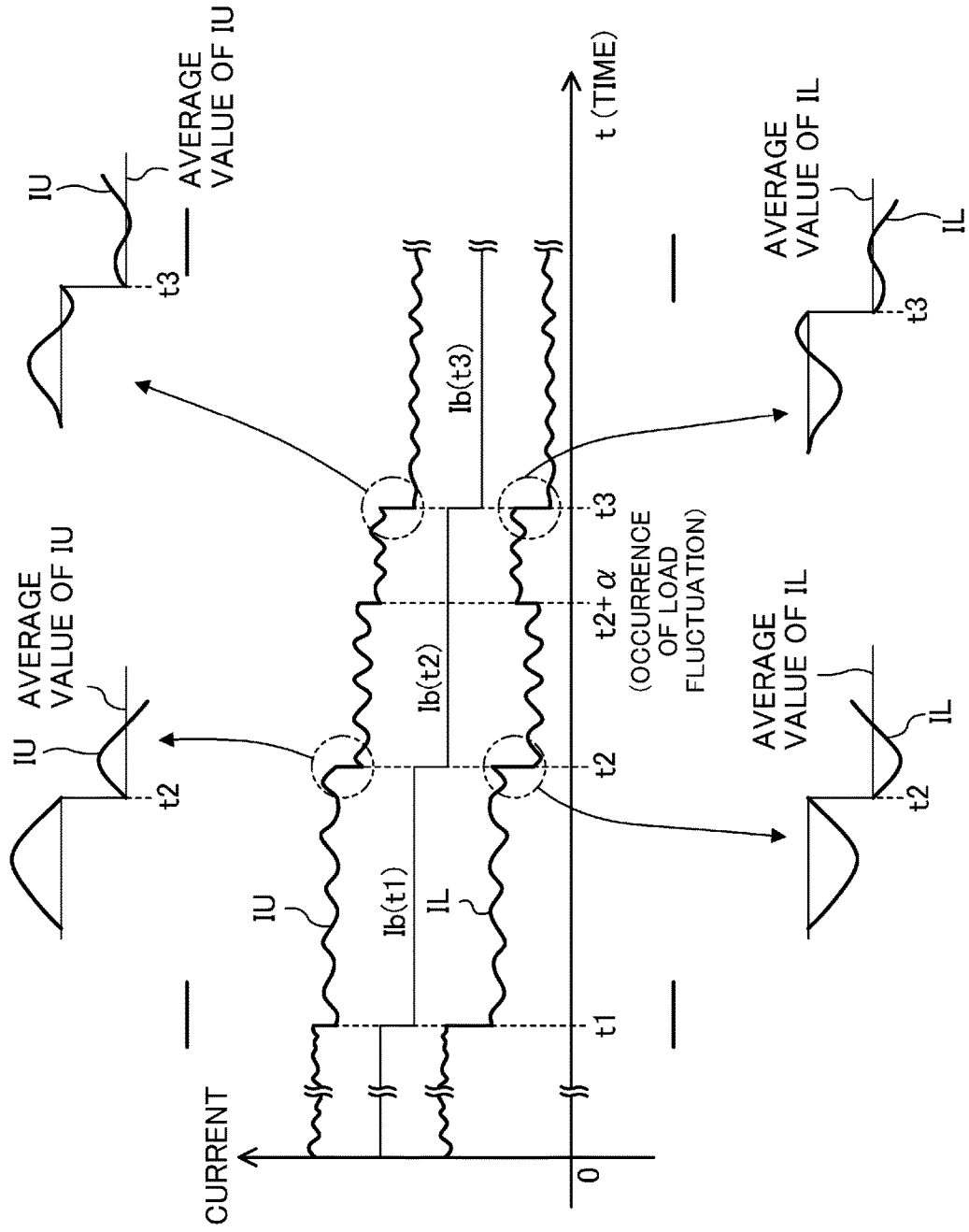
FIG. 6 is a timing chart showing example changes of an upper and a lower coil current.

FIG. 6 is a timing chart showing example changes of the upper and lower coil currents ($I_U$, $I_L$). In the timing chart of FIG. 6, the vertical axis represents current values. In the example of FIG. 6, the bias current ($I_b$) is updated at times t1, t2, and t3. For example, the bias current ($I_b$) is updated with $I_b$(t1) at time (t1), and is constant at $I_b$(t1) during a period of time from time (t1) to time (t2).

At time (t2), the process of step (S04) is performed to update the bias current ($I_b$) with $I_b$(t2). In other words, in the magnetic bearing (20), the bias current ($I_b$) is half fixed. The value of $I_b$(t2) is a geometric mean of the direct current component (=$I_b$(t1)) of the bias current ($I_b$) before time (t2) and the direct current component of the control current ($I_d$). By calculating the bias current ($I_b$) in such a manner, the value of the bias current ($I_b$) is updated to approach the value of the control current ($I_d$).

During a period of time from time (t2) to time (t3), the current controller (32) uses $I_b$(t2) in calculating the upper and lower coil currents ($I_U$, $I_L$). Specifically, the current controller (32) outputs voltage command values for the upper and lower coils to the power supply device (40) so that the upper coil current ($I_U$)=$I_b$(t2)+$I_d$ flows through the upper coil and the lower coil current ($I_L$)=$I_b$(t2)−$I_d$ flows through the lower coil. As can be seen from the relational expression (C), as $I_b$ approaches $I_d$ ($I_b$→$I_d$), the value of $I_L$ approaches zero. Specifically, if the value of the bias current ($I_b$) is updated so that the value of the bias current ($I_b$) approaches the value of the control current ($I_d$), an average value of the lower coil current ($I_L$) decreases to approach zero (ideally becomes zero).

Also in the example of FIG. 6, at time (t2), an average value of the lower coil current ($I_L$) decreases. The upper coil current ($I_U$) is also controlled by the current controller (32) so that the difference between the upper coil current ($I_U$) and the lower coil current ($I_L$) becomes a value required for the position control. As a result, an average value (e.g., an average based on the value of an integral) of the upper coil current ($I_U$) also decreases. Note that as the average value of the lower coil current ($I_L$) approaches zero, the lower coil current ($I_L$) may also be controlled to a negative value. Therefore, as described above, the power supply device (40) is configured to allow the lower coil current ($I_L$) to flow both forward and backward.

In the example of FIG. 6, at time (t2+α), the load ($L_d$) fluctuates. If the load ($L_d$) fluctuates, the current command value etc. also fluctuate. In this example, as the upper coil current ($I_U$) decreases, the lower coil current ($I_L$) increases, and as a result, the difference between the upper coil current ($I_U$) and the lower coil current ($I_L$) decreases. In this case, the value of the bias current ($I_b$) which is used in calculating the upper and lower coil currents ($I_U$, $I_L$) is $I_b$(t2).

However, at time (t3), the process of step (S04) is performed to update the bias current ($I_b$) with $I_b$(t3). Here, also, $I_b$(t3) decreases, and an average value of the lower coil current ($I_L$) decreases. An average value of the upper coil current ($I_U$) also decreases. In other words, in this embodiment, the bias current ($I_b$) is updated at predetermined intervals, and therefore, the lower coil current ($I_L$) can be decreased, following the fluctuation of the load ($L_d$).

Figure 7:
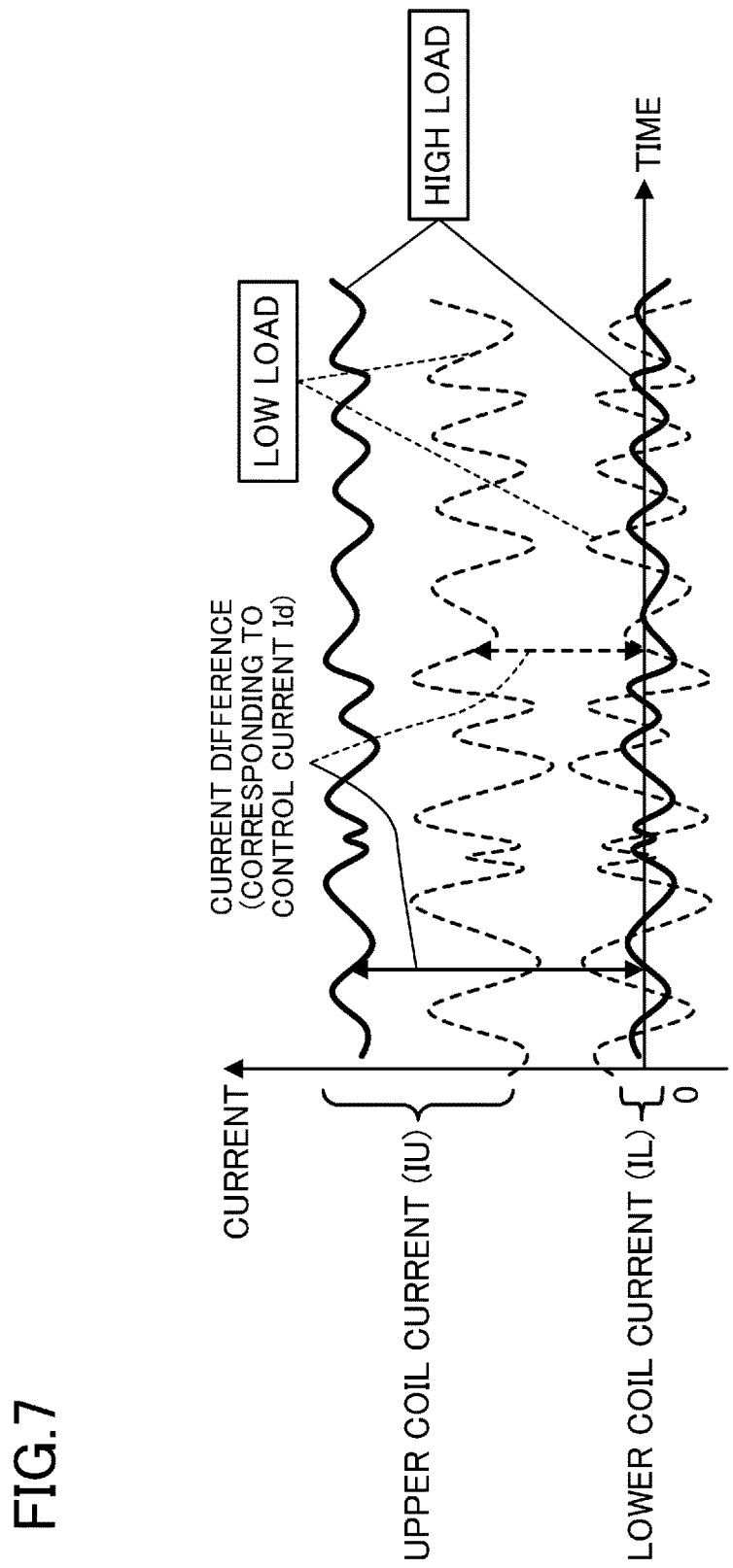
FIG. 7 is a timing chart showing example changes in the upper and lower coil currents when a feedback gain is adjusted.
Figure 13:
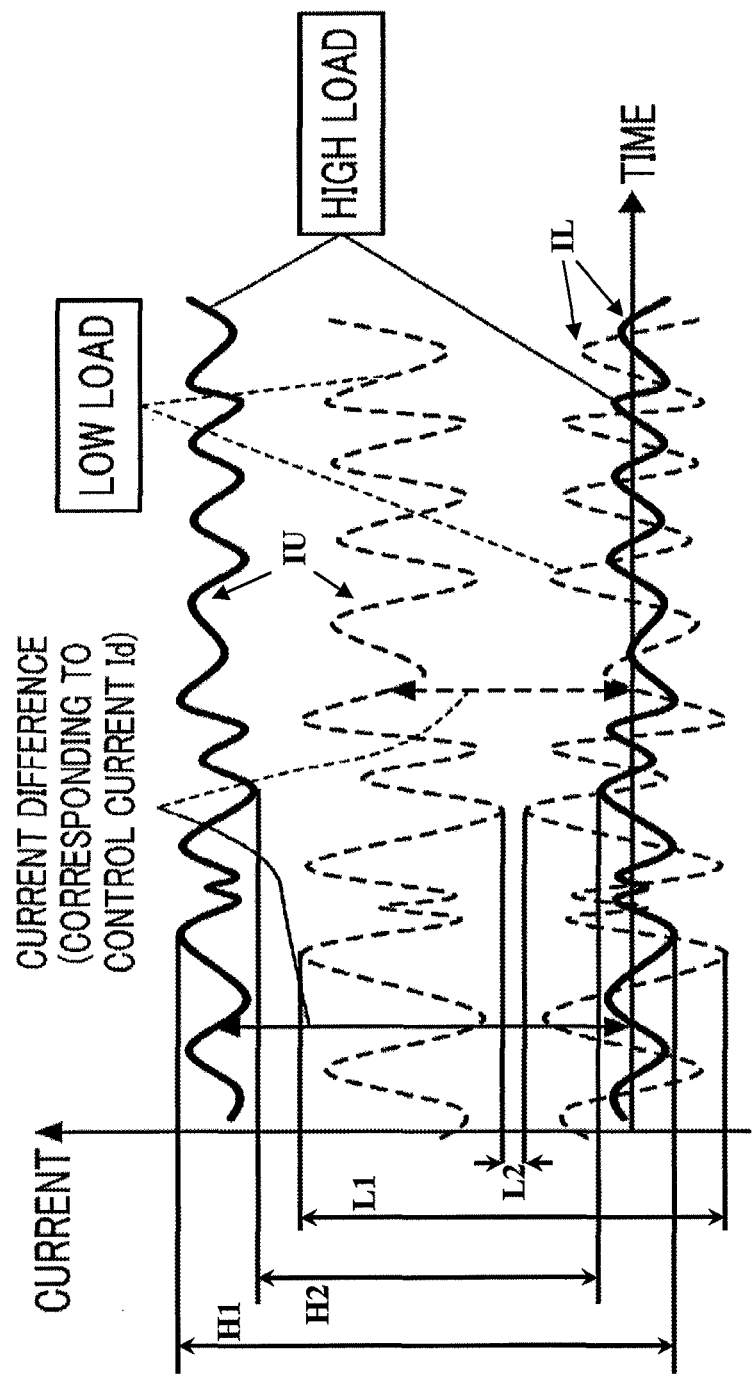
FIG. 13 is a timing chart corresponding to FIG. 7 which further illustrates how to calculate a change range of the current difference between the upper coil current and the lower coil current.

FIG. 7 is a timing chart showing example changes in the upper and lower coil currents ($I_U$, $I_L$) when the feedback gain ($K_c$) is adjusted. FIG. 7 shows an example state which occurs when the load ($L_d$) decreases and the magnitude of the amplitude of the drive shaft (13) does not change before and after the decrease of the load ($L_d$). In this case, as shown in FIG. 7, the change range of the current difference between the upper coil current ($I_U$) and the lower coil current ($I_L$) increases. Particularly, the current difference between the upper coil current and the lower coil current (which is calculated by subtracting $I_L$ from $I_U$) changes while moving along the time axis of FIG. 7. As such, there is a particular range according to which this current difference (i.e., $I_U$−$I_L$) changes, and this range can be referred to as a "change range." FIG. 13 (which includes the same timing chart as FIG. 7) illustrates how the change range of the current difference between the upper and lower coil currents can be calculated. When the upper coil current ($I_U$) is lower (due to a low load), the change range of the current difference is calculated by subtracting L2 (which represents the lowest amount of current difference) from L1 (which represents highest amount of current difference) in FIG. 13. On the other hand, when the upper coil current increases (due to a high load), the change range of the current difference is calculated by subtracting H2 from H1 in FIG. 13. As shown in FIG. 13, the difference H1−H2 is smaller than the difference L1−L2, indicating that the change range of the current difference decreases when the upper coil current increases.

Advantages of this Embodiment

As described above, in this embodiment, the value of the bias current ($I_b$) is sequentially updated so that the value of the bias current ($I_b$) approaches the value of the control current ($I_d$), whereby the upper and lower coil currents ($I_U$, $I_L$) can be decreased. Therefore, in this embodiment, the power consumption of the magnetic bearings (20, 20) can be reduced.

The feedback gain ($K_c$) is adjusted according to the relational expression (B) in synchronization with the updating of the bias current ($I_b$), and therefore, a change in position control loop frequency characteristics due to a change in the bias current ($I_b$) can be canceled.

Although, in the above example, the term "decrease" with respect to an average value means that the average value approaches zero, the controller (30) may be configured so that the lower coil current ($I_L$) gradually approaches a value other than zero.

Variation of First Embodiment

Figure 8:
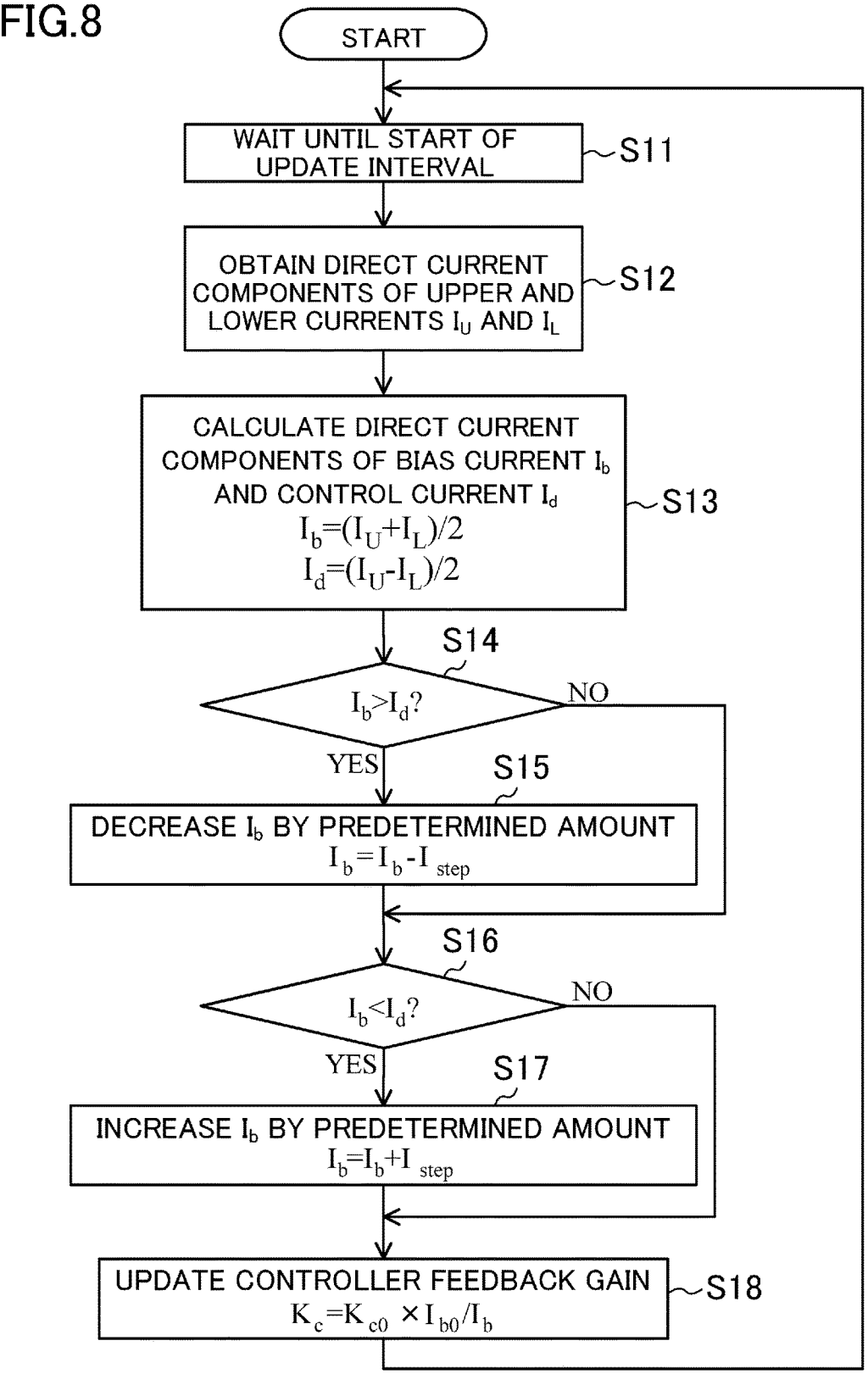
FIG. 8 is a flowchart for describing adjustment of a bias current according to a variation of the first embodiment.

The updating of the value of the bias current ($I_b$) is not limited to the method of the first embodiment. FIG. 8 is a flowchart for describing adjustment of a bias current according to a variation of the first embodiment. In this example, the bias current adjuster (34) updates and changes the value of the bias current ($I_b$) a predetermined amount ($I_{step}$) at a time. Specifically, the bias current adjuster (34) performs operation of steps (S11)-(S18) of FIG. 8. The processes of steps (S11)-(S13) are the same as those of steps (S01)-(S03) described in the first embodiment.

In step (S14), the bias current adjuster (34) compares the value of the bias current ($I_b$) with the value of the control current ($I_d$). If the result of the comparison shows that the value of the bias current ($I_b$) is larger than the value of the control current ($I_d$), the bias current adjuster (34) proceeds to the process of step (S15), and otherwise, the bias current adjuster (34) proceeds to the process of step (S16).

In step (S15), the bias current adjuster (34) decreases the bias current ($I_b$) by the predetermined amount ($I_{step}$). Specifically, the bias current adjuster (34) calculates $I_b-I_{step}$ as a new bias current ($I_b$).

In step (S16), the bias current adjuster (34) compares the value of the bias current ($I_b$) with the value of the control current ($I_d$). If the result of the comparison shows that the value of the bias current ($I_b$) is smaller than the value of the control current ($I_d$), the bias current adjuster (34) proceeds to the process of step (S17), and otherwise, the bias current adjuster (34) proceeds to the process of step (S18).

In step (S17), the bias current adjuster (34) increases the bias current ($I_b$) by the predetermined amount ($I_{step}$). Specifically, the bias current adjuster (34) calculates $I_b+I_{step}$ as a new bias current ($I_b$).

Thereafter, similar to the first embodiment, the current controller (32) outputs voltage command values for the upper and lower coils to the power supply device (40) in order to cause the upper and lower coil currents ($I_U$, $I_L$) determined according to the relational expression (C) to flow through the coils. Thus, in this variation, the bias current adjuster (34) increases or decreases the value of the bias current ($I_b$) by the predetermined amount (Istep) so that the value of the bias current ($I_b$) approaches the value of the control current ($I_d$).

Note that, in step (S18), similar to step (S05) of the first embodiment, the position controller (31) updates the feedback gain ($K_c$) for the position control based on the command value which is generated by the gain controller (33) according to the relational expression (B).

Advantages of this Variation

Also in this embodiment, the above operation of the bias current adjuster (34) causes the value of the bias current ($I_b$) to approach the value of the control current ($I_d$). Therefore, also in this embodiment, the upper and lower coil currents ($I_U$, $I_L$) can be decreased, whereby the power consumption of the magnetic bearings (20, 20) can be reduced.

Also in this variation, the adjustment of the feedback gain ($K_c$) according to the relational expression (B) is performed in synchronization with the updating of the bias current ($I_b$). Therefore, a change in position control loop frequency characteristics due to a change in the bias current ($I_b$) can be canceled.

Second Embodiment of the Invention

Figure 9:
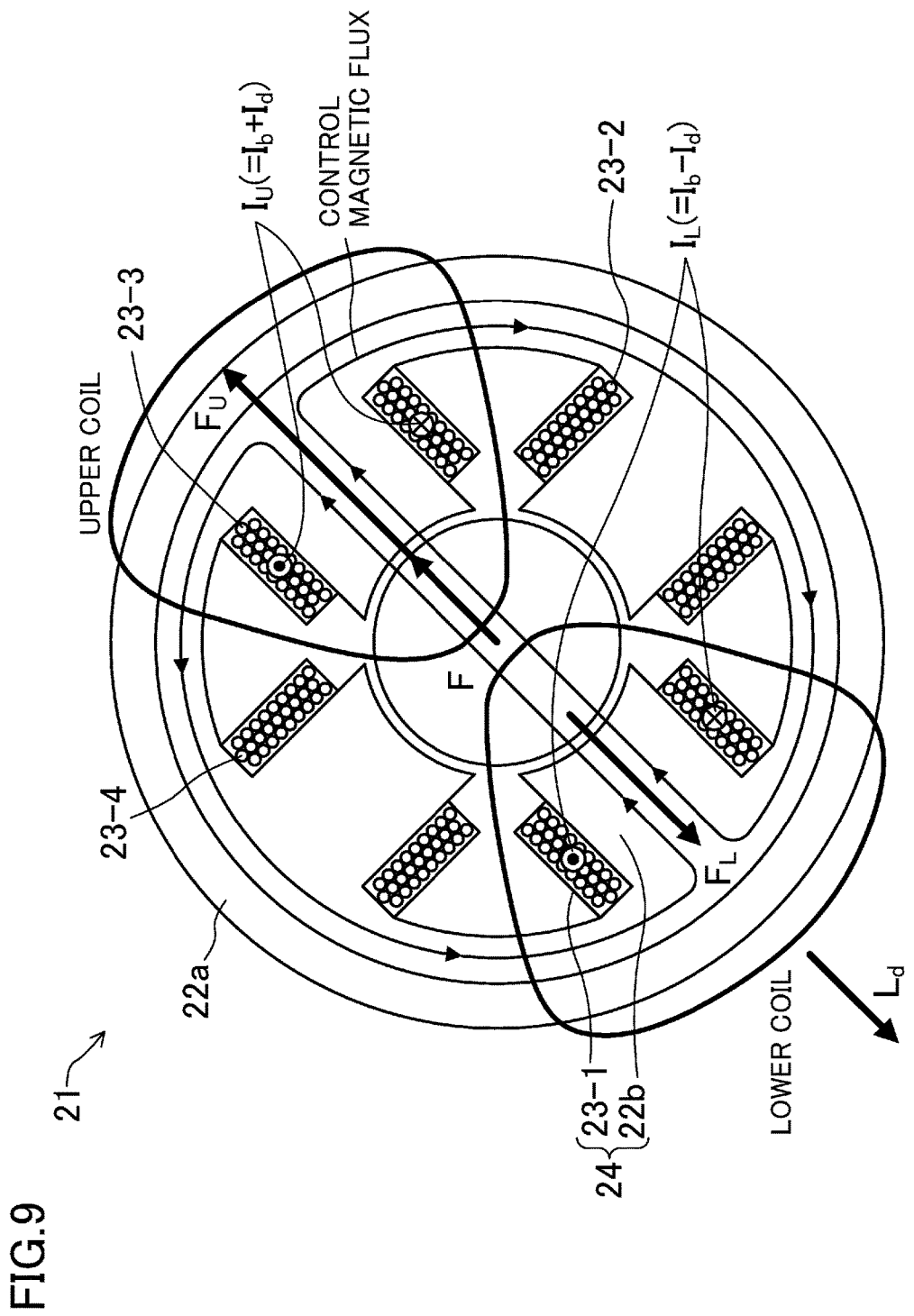
FIG. 9 is a transverse cross-sectional view of a magnetic bearing according to a second embodiment.
Figure 10:
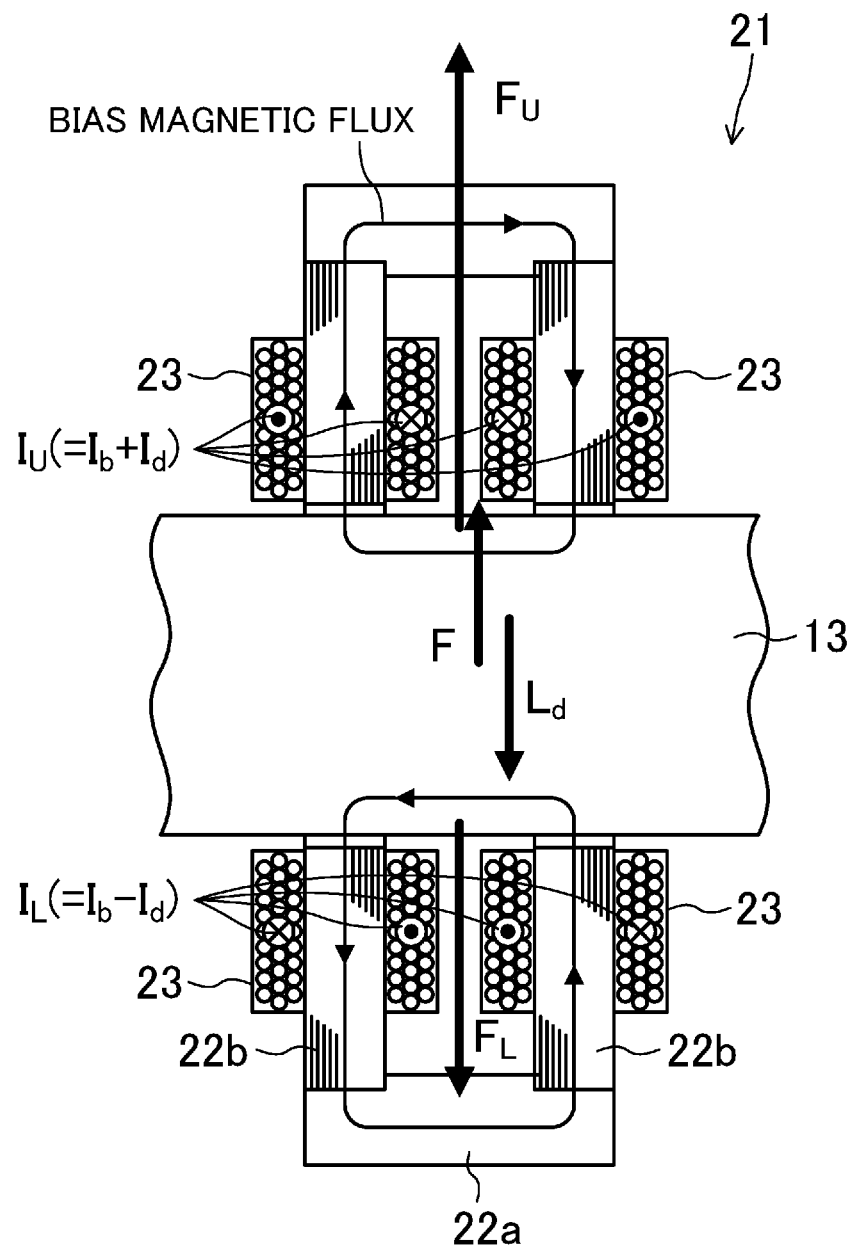
FIG. 10 is a longitudinal cross-sectional view of the magnetic bearing of the second embodiment.

FIG. 9 is a transverse cross-sectional view of a magnetic bearing (20) according to a second embodiment. FIG. 10 is a longitudinal cross-sectional view of the magnetic bearing (20) of the second embodiment. As shown in FIG. 9, the magnetic bearing (20) of this embodiment is a so-called homopolar radial bearing.

Similar to the first embodiment, in the magnetic bearing (20) of this embodiment, a stator (21) includes a core portion (22) and coils (23). The core portion (22) includes a back yoke portion (22a) and a plurality of tooth portions (22b). The back yoke portion (22a) has a generally tubular shape. Each tooth portion (22b) is integrally formed with the back yoke portion (22a), protruding from an inner circumferential surface of the back yoke portion (22a) inward in the radial direction.

In this embodiment, eight tooth portions (22b) are provided. Specifically, as shown in FIG. 10, two stages of tooth portions (22b) are arranged side by side in the central axis direction of a drive shaft (13). As shown in FIG. 9, four tooth portions (22b) in each stage are arranged along the inner circumference of the back yoke portion (22a) and are equally spaced (pitch: 90 degrees). A coil (23) is wound around each tooth portion (22b), and therefore, the stator (21) includes eight electromagnets (24). In this example, the coils (23) arranged side by side in two stages are paired. Specifically, in this example, there are four coil pairs. Also in this example, the paired coils (23) are connected together. The winding direction and current passage direction of the coil (23) of each electromagnet (24) are set so that magnetic flux is generated in a direction indicated by an arrow in FIG. 10. Also in this embodiment, the combined electromagnetic force (F) of the electromagnets (24) is exerted on the drive shaft (13) so that the drive shaft (13) is supported without contact. Also in FIG. 9, the upper and lower coils are indicated by surrounding thick lines. For a load ($L_d$) shown in FIG. 9, a coil (23-1) is the lower coil, and a coil (23-3) is the upper coil.

Also in the magnetic bearing (20) thus configured, similar to the first embodiment and its variation, by controlling the value of the bias current ($I_b$) to approach the value of the control current ($I_d$), the upper and lower coil currents ($I_U$, $I_L$) can be decreased, whereby the power consumption of the magnetic bearings (20, 20) can be reduced.

Third Embodiment of the Invention

Figure 11:
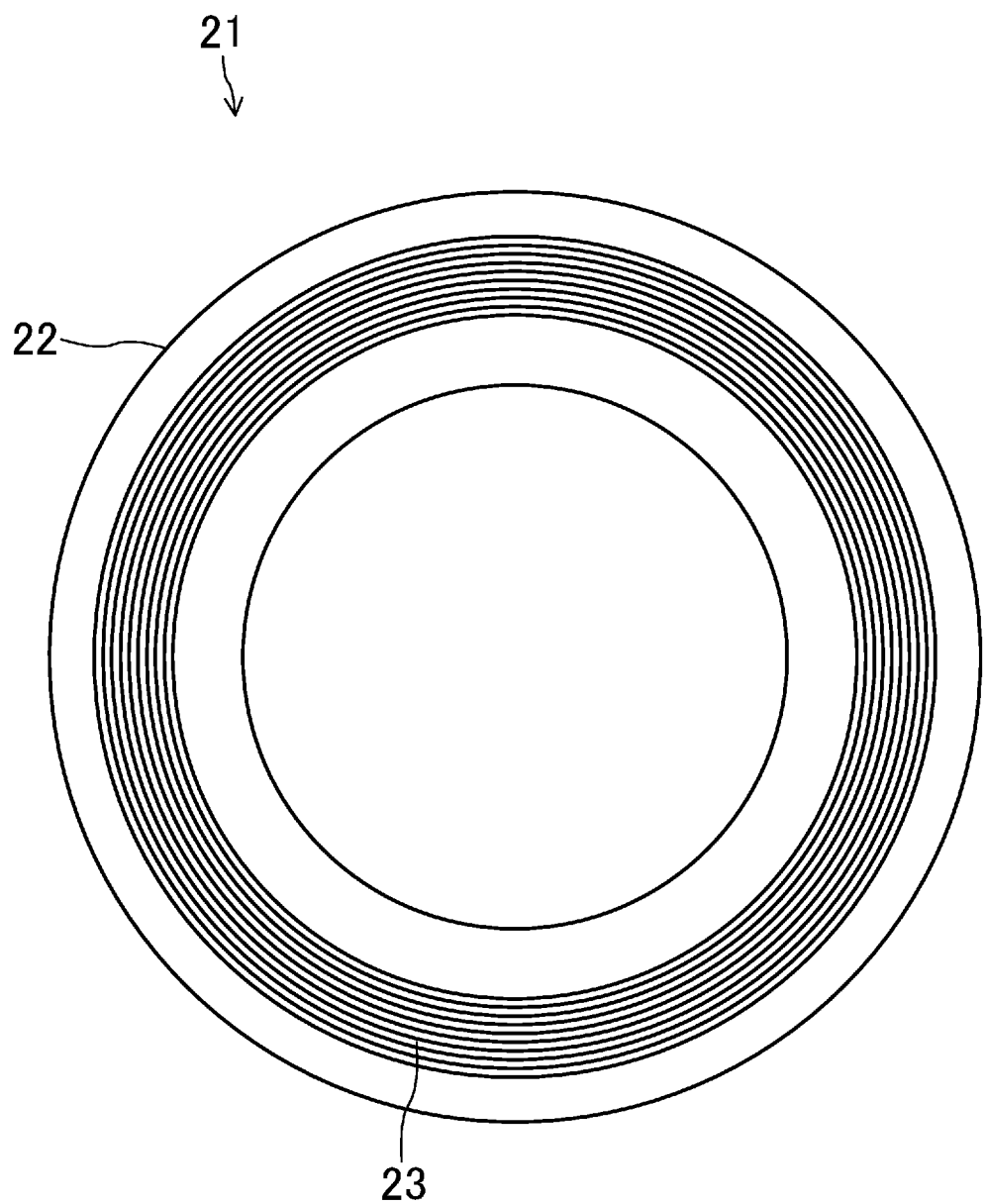
FIG. 11 is a transverse cross-sectional view of a magnetic bearing according to a third embodiment.
Figure 12:
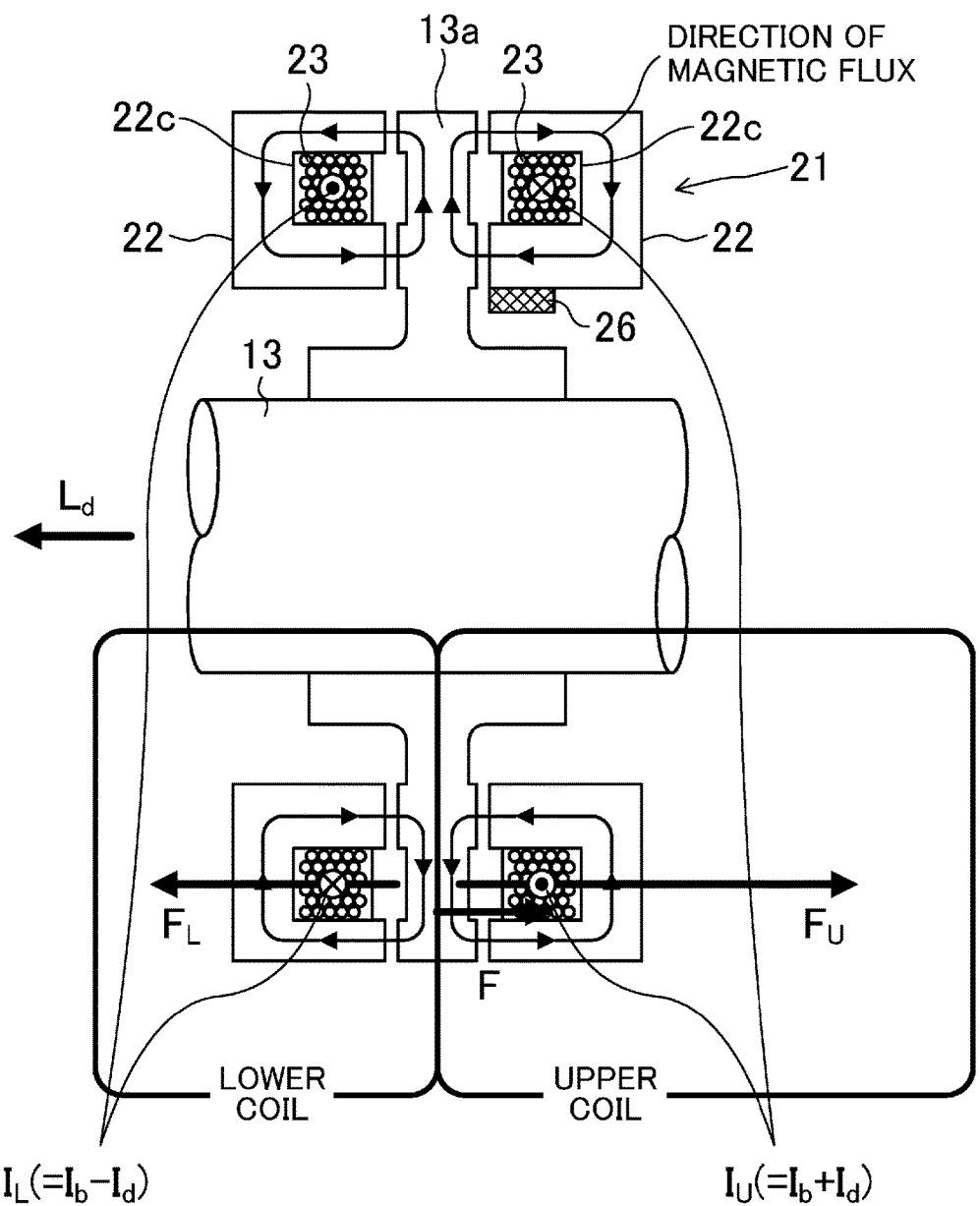
FIG. 12 is a longitudinal cross-sectional view of the magnetic bearing of the third embodiment.

FIG. 11 is a transverse cross-sectional view of a magnetic bearing (20) according to a third embodiment. FIG. 12 is a longitudinal cross-sectional view of the magnetic bearing (20) of the third embodiment. The magnetic bearing (20) of this embodiment is a so-called thrust bearing. As shown in FIG. 12, a disk-shaped thrust disk (13a) is fixed to a drive shaft (13) of an electric motor (10). In the magnetic bearing (20), a position in the axial direction of the thrust disk (13a), i.e., a position in the axial direction of the drive shaft (13), is controlled.

Configuration of Magnetic Bearing (20)

The magnetic bearing (20) includes a stator (21), a power supply device (40), a gap sensor (26), and a controller (30). The gap sensor (26) is attached in the vicinity of the thrust disk (13a) in order to detect the position in the axial direction of the thrust disk (13a).

The stator (21) includes core portions (22) and coils (23). In this embodiment, the stator (21) includes two core portions (22). The core portions (22) each have a ring-like form, and are located on the opposite sides of the axial direction of the thrust disk (13a) with a predetermined air gap being formed between the core portions (22) and the thrust disk (13a).

As shown in FIG. 12, each core portion (22) has a circumferential groove (22c) formed in a surface thereof facing the thrust disk (13a). The coil (23) is accommodated in the circumferential groove (22c). In other words, in this embodiment, one electromagnet (24) is formed in each core portion (22). The direction of a current in each coil (23) is set so that magnetic flux is generated in a direction indicated by an arrow in FIG. 12.

Note that, in this embodiment, an "upper coil" refers to the coil (23) of the electromagnet (24) which generates an attraction force (electromagnetic force ($F_U$)) whose direction is opposite to the direction of a load ($L_d$) exerted on the drive shaft (13) in the thrust direction (axial direction). A "lower coil" refers to the coil (23) of the electromagnet (24) which generates an attraction force (electromagnetic force ($F_L$)) whose direction is the same as the direction of the load ($L_d$). In other words, also in this example, the terms "upper" and "lower" with respect to a coil are defined based on a relationship between the direction of the electromagnetic force and the direction of the load ($L_d$), and may or may not match upper and lower positions of the magnetic bearing (20) as it is installed.

In this embodiment, the combined electromagnetic force (F) of the electromagnets (24) is exerted on the thrust disk (13a) so that the thrust disk (13a) is maintained at a predetermined position without contact with the stator (21), to support the drive shaft (13) in the axial direction. In this case, as shown in the first embodiment and its variation, by controlling the value of the bias current ($I_b$) to approach the value of the control current ($I_d$), the upper and lower coil currents ($I_U$, $I_L$) can be decreased, whereby the power consumption of the magnetic bearing (20) can be reduced.

Other Embodiments

<1> There is a possibility that, in the magnetic bearing (20), the direction of the actual load ($L_d$) deviates from the expected direction due to some reason. For example, the actual load ($L_d$) may be exerted in a direction perpendicular to the expected direction. In this case, an average load exerted on each of the electromagnet (24) of the coil (23) assumed as the upper coil (first coil) and the electromagnet (24) of the coil (23) assumed as the lower coil (second coil) becomes zero. Therefore, the currents ($I_U$, $I_L$) flowing through both of the coils assumed as the upper and lower coils have opposite polarities and the same magnitude. As a result, the electromagnets (24) of the coils assumed as the upper and lower coils attract each other with the same force, and therefore, the position control may be caused to be unstable. Moreover, when the adjustment of the control gain ($K_c$) is simultaneously performed, then if the upper coil current ($I_U$) becomes excessively small, the control gain ($K_c$) becomes excessively large, so that an internal variable or a command voltage of the controller may be saturated, likely leading to an unstable position control.

Therefore, in order to maintain a stable position control, the controller (30) preferably adjusts the lower coil current ($I_L$) so that the magnitude of the sum of an average value of the upper coil current ($I_U$) and an average value of the lower coil current ($I_L$) does not become lower than or equal to a predetermined limit value.

<2> In the bias current adjuster (34), the bias current ($I_b$) may be adjusted so that the magnitude of the absolute value of the bias current ($I_b$) does not become lower than or equal to a threshold which is determined based on conditions for operation of the magnetic bearing (20). In this case, a stable position control can be similarly maintained.

<3> The lower coil current ($I_L$) is preferably adjusted after the load ($L_d$) has been stabilized. For example, when the lower coil current ($I_L$) is frequently largely adjusted, this may be likely to cause noise etc. It can be determined whether or not the load ($L_d$) is stable, using a variety of techniques. For example, it may be determined that "the load has been stabilized" if the controller (30) has detected at least one of an average value of the upper coil current ($I_U$) and an average value of the lower coil current ($I_L$) a plurality of times, at the update timings, and the change range is lower than or equal to a predetermined threshold. The controller (30) may adjust the bias current ($I_b$) (i.e., the lower coil current ($I_L$)) if "the load has been stabilized." Here, the "predetermined threshold" may be a predetermined fixed value, or may, for example, be changed, depending on conditions for operation of a device which is supported by the magnetic bearing.

<4> In the bias current adjuster (34), an average value of the control current ($I_d$) may be obtained, and when the change range of the average value has become lower than or equal to a predetermined threshold, it may be determined that "the load has been stabilized," and the bias current ($I_b$) may be adjusted. Here, the "predetermined threshold" may be a predetermined fixed value, or may, for example, be changed, depending on conditions for operation of a device which is supported by the magnetic bearing.

<5> It is determined whether or not the "load has been stabilized," by detecting at least one of an average value of the upper coil current ($I_U$) and an average value of the lower coil current ($I_L$). When the change range of the detected average value which is higher than or equal to a certain frequency is lower than or equal to a predetermined threshold, it may be determined that "the load has been stabilized." This determination may be performed by, for example, the controller (30). Here, also, the "predetermined threshold" may be a predetermined fixed value, or may, for example, be changed, depending on conditions for operation of a device which is supported by the magnetic bearing.

<6> When the change range of an average value of the control current ($I_d$) which is higher than or equal to a predetermined frequency is smaller than a predetermined threshold, it may be determined that "the load has been stabilized." This determination may be performed by, for example, the bias current adjuster (34). Here, also, the "predetermined threshold" may be a predetermined fixed value, or may, for example, be changed, depending on conditions for operation of a device which is supported by the magnetic bearing.

<7> The application of the magnetic bearing (20) is not limited to the turbo compressor (1). For example, the magnetic bearing (20) may be applied to various devices including a rotating shaft, such as a turbo molecular pump etc.

<8> It may not be necessary to periodically adjust the bias current ($I_b$). The bias current ($I_b$) may be adjusted at any timing.

INDUSTRIAL APPLICABILITY

The present invention is useful as a magnetic bearing which supports a rotating shaft using an electromagnetic force without contact, and a compressor including such a magnetic bearing.

DESCRIPTION OF REFERENCE CHARACTERS

10 ELECTRIC MOTOR
13 DRIVE SHAFT
20 MAGNETIC BEARING
21 STATOR
24 ELECTROMAGNET
30 CONTROLLER
31 POSITION CONTROLLER (CONTROLLER)
32 CURRENT CONTROLLER (CONTROLLER)
34 BIAS CURRENT ADJUSTER

The invention claimed is:

1. A magnetic bearing comprising:
a stator including a plurality of electromagnets and configured to exert a combined electromagnetic force of the plurality of electromagnets on a drive shaft having a fluctuating load; and
a controller configured to,
control a current difference between a first coil current passed through a coil of the electromagnet generating an electromagnetic force in a direction opposite to that of the load and a second coil current passed through another coil of the electromagnet generating an electromagnetic force in the same direction as that of the load to perform periodic position control on the drive shaft, and
periodically adjust the second coil current to reduce an average value of the second coil current,
wherein the controller performs the periodic position control at different intervals than the periodic adjustment of the second coil current.

2. The magnetic bearing of claim 1, wherein
the controller adjusts the second coil current so that the magnitude of the absolute value of the sum of an average value of the first coil current and an average value of the second coil current does not become lower than or equal to a predetermined limit value.

3. The magnetic bearing of claim 1, wherein
the controller obtains at least one of an average value of the first coil current and an average value of the second coil current, and adjusts the second coil current when a change range of the obtained average value becomes lower than or equal to a threshold determined based on conditions for operation of a device supported by the magnetic bearing.

4. The magnetic bearing of claim 1, wherein
the controller obtains at least one of an average value of the first coil current and an average value of the second coil current, filters out a frequency component of the obtained average value which is smaller than a predetermined frequency, and adjusts the second coil current when a change range of the filtered average value becomes smaller than or equal to a threshold determined based on conditions for operation of a device supported by the magnetic bearing.

5. A compressor comprising:
the magnetic bearing of claim 1;
an electric motor including a drive shaft configured to be supported by the magnetic bearing without contact; and
a compression mechanism configured to be driven by the electric motor.

6. The magnetic bearing of claim 1, wherein
the controller includes
a controller configured to control a control current causing each electromagnet to generate an electromagnetic force, and a bias current added to the control current to linearize a relationship between a value of the control current and the combined electromagnetic force, and
a bias current adjuster configured to adjust a value of the bias current to cause the value of the bias current to approach the value of the control current.

7. The magnetic bearing of claim 6, wherein
the bias current adjuster adjusts the value of the bias current to a geometric mean of the value of the bias current and the value of the control current.

8. The magnetic bearing of claim 6, wherein
the bias current adjuster adjusts the value of the bias current a predetermined amount at a time.

9. The magnetic bearing of claim 6, wherein
the bias current adjuster adjusts the bias current so that the magnitude of the absolute value of the bias current does not become lower than or equal to a threshold determined based on conditions for operation of a device supported by the magnetic bearing.

10. The magnetic bearing of claim 6, wherein
the bias current adjuster adjusts the bias current when a change range of an average value of the control current becomes lower than or equal to a threshold determined based on conditions for operation of a device supported by the magnetic bearing.

11. The magnetic bearing of claim 6, wherein
an average value of the control current is obtained, and a frequency component of the average value which is smaller than a predetermined frequency is filtered out; and
the bias current adjuster adjusts the bias current when a change range of the filtered average value of the control current higher than or equal to a predetermined frequency becomes smaller than or equal to a threshold determined based on conditions for operation of a device supported by the magnetic bearing.

12. The magnetic bearing of claim 1, wherein
the controller increases a change range of the current difference when the first coil current decreases depending on the load, and decreases the change range of the current difference when the first coil current increases depending on the load.

13. The magnetic bearing of claim 12, wherein
the controller adjusts the second coil current so that the magnitude of the absolute value of the sum of an average value of the first coil current and an average value of the second coil current does not become lower than or equal to a predetermined limit value.

14. The magnetic bearing of claim 12, wherein
the controller obtains at least one of an average value of the first coil current and an average value of the second coil current, and adjusts the second coil current when a change range of the obtained average value becomes lower than or equal to a threshold determined based on conditions for operation of a device supported by the magnetic bearing.

15. The magnetic bearing of claim 12, wherein
the controller obtains at least one of an average value of the first coil current and an average value of the second coil current, and adjusts the second coil current when a change range of the obtained average value higher than or equal to a predetermined frequency becomes smaller than or equal to a threshold determined based on conditions for operation of a device supported by the magnetic bearing.

16. The magnetic bearing of claim 12, wherein
the controller includes
a controller configured to control a control current causing each electromagnet to generate an electromagnetic force, and a bias current added to the control current to linearize a relationship between a value of the control current and the combined electromagnetic force, and
a bias current adjuster configured to adjust a value of the bias current to cause the value of the bias current to approach the value of the control current.

17. The magnetic bearing of claim 16, wherein
the bias current adjuster adjusts the value of the bias current a predetermined amount at a time.

18. The magnetic bearing of claim 16, wherein the bias current adjuster adjusts the value of the bias current to a geometric mean of the value of the bias current and the value of the control current.

19. The magnetic bearing of claim 16, wherein the bias current adjuster adjusts the bias current so that the magnitude of the absolute value of the bias current does not become lower than or equal to a threshold determined based on conditions for operation of a device supported by the magnetic bearing.

20. The magnetic bearing of claim 16, wherein the bias current adjuster adjusts the bias current when a change range of an average value of the control current becomes lower than or equal to a threshold determined based on conditions for operation of a device supported by the magnetic bearing.

* * * * *